US011946433B2

United States Patent
Kumareshan et al.

(10) Patent No.: US 11,946,433 B2
(45) Date of Patent: Apr. 2, 2024

(54) PROFILED CYLINDER LINER FOR BORE DISTORTION CONTROL

(71) Applicant: Cummins Inc., Columbus, IN (US)

(72) Inventors: Vijaysai Karuppiah Kumareshan, Columbus, IN (US); John Jerl Purcell, III, Louisa, VA (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/751,867

(22) Filed: May 24, 2022

(65) Prior Publication Data

US 2022/0282685 A1    Sep. 8, 2022

Related U.S. Application Data

(63) Continuation of application No. PCT/US2020/065262, filed on Dec. 16, 2020.

(60) Provisional application No. 62/949,279, filed on Dec. 17, 2019.

(51) Int. Cl.
  *F02F 1/00*   (2006.01)
  *F16J 10/04*  (2006.01)

(52) U.S. Cl.
  CPC .................... *F02F 1/004* (2013.01)

(58) Field of Classification Search
  CPC .................... F02F 1/004; F16J 10/04
  See application file for complete search history.

(56) References Cited

U.S. PATENT DOCUMENTS

| 3,882,842 A | 5/1975 | Bailey et al. |
| 4,244,330 A * | 1/1981 | Baugh ............... F02F 11/005 |
| | | 123/193.2 |
| 5,165,367 A * | 11/1992 | Morris ............... F02F 1/163 |
| | | 123/41.84 |

(Continued)

FOREIGN PATENT DOCUMENTS

| CN | 107091164 A | 8/2017 |
| JP | S5343116 A | 4/1978 |
| WO | 2016159970 A1 | 10/2016 |

OTHER PUBLICATIONS

International Preliminary Report on Patentability; International Searching Authority; International Patent Application No. PCT/US2020/065262; dated Jul. 1, 2022; 7 pages.

(Continued)

*Primary Examiner* — Grant Moubry
(74) *Attorney, Agent, or Firm* — Taft Stettinius & Hollister LLP

(57) ABSTRACT

A cylinder liner for a cylinder bore of a cylinder of an internal combustion engine. The cylinder liner includes a cylindrical casing having an outer surface and an inner surface, wherein each surface has a respective surface area. The liner includes a liner seat positioned on the outer surface wherein the liner seat engages with the cylinder bore to position the cylindrical casing in the cylinder bore. The liner includes a relief feature positioned on the outer surface either adjacent the liner seat or above a mid-stop wherein the relief feature resists distortion of the cylindrical casing from the cylinder bore. The liner can include a stiffening feature positioned above the relief feature on the outer surface. The relief feature forms a depressed surface on the outer surface and the stiffening feature forms a raised surface on the outer surface of the cylindrical casing.

14 Claims, 2 Drawing Sheets

(56) References Cited

U.S. PATENT DOCUMENTS

| | | | | |
|---|---|---|---|---|
| 5,402,754 | A | * | 4/1995 | Gunnarsson .............. F02F 1/16 |
| | | | | 123/193.2 |
| 5,979,374 | A | * | 11/1999 | Jackson .................... F02F 1/14 |
| | | | | 123/193.2 |
| 6,044,821 | A | | 4/2000 | Weng |
| 6,116,198 | A | * | 9/2000 | Kirtley .................... F02F 1/163 |
| | | | | 123/193.3 |
| 6,328,001 | B1 | | 12/2001 | Kirtley et al. |
| 6,357,400 | B1 | | 3/2002 | Bedwell et al. |
| 6,557,513 | B1 | | 5/2003 | Hill et al. |
| 6,675,750 | B1 | | 1/2004 | Wagner |
| 7,334,546 | B2 | | 2/2008 | Rasmussen |
| 8,443,768 | B2 | * | 5/2013 | Berghian ................. F02F 1/16 |
| | | | | 123/193.2 |
| 9,057,341 | B2 | | 6/2015 | Strandburg, III et al. |
| 9,482,178 | B2 | | 11/2016 | Batta |
| 9,593,639 | B2 | | 3/2017 | Batta |
| 10,107,228 | B2 | | 10/2018 | Sharma et al. |
| 2013/0032117 | A1 | * | 2/2013 | Worthington ............ F16J 10/04 |
| | | | | 29/888.011 |
| 2014/0326130 | A1 | * | 11/2014 | Gniesmer ............... F02F 1/004 |
| | | | | 123/193.2 |
| 2020/0248645 | A1 | * | 8/2020 | Bochart .................... F01P 3/02 |

OTHER PUBLICATIONS

International Search Report; International Searching Authority; International Patent Application No. PCT/US2020/065262; dated Mar. 19, 2021; 2 pages.

Written Opinion of the International Searching Authority; International Searching Authority; International Patent Application No. PCT/US2020/065262; dated Mar. 19, 2021; 6 pages.

Extended European Search Report; European Patent Office; European Patent Application No. 20902651.7; dated Dec. 6, 2023; 17 pages.

* cited by examiner

PROFILED CYLINDER LINER FOR BORE DISTORTION CONTROL

CROSS-REFERENCE TO RELATED APPLICATIONS

The present application is a continuation of International PCT Application No. PCT/US2020/065262 filed on Dec. 16, 2020, which claims the benefit of the filing date of U.S. Provisional Application No. 62/949,279 filed on Dec. 17, 2019, the contents of each application is incorporated herein by reference in their entirety.

FIELD OF THE INVENTION

The present disclosure relates to a cylinder liner and more particularly to a profile on an outer surface of the cylinder liner to control and reduce cylinder liner bore distortion.

BACKGROUND

Internal combustion engines include one or more cylinders wherein each cylinder includes a piston in the cylinder bore. During the combustion cycle, the piston moves in an upstroke direction and a downstroke direction relative to the cylinder bore. A cylinder liner is a cylindrical part to be fitted into an engine block to form a cylinder. The cylinder liner, serving as the inner wall of a cylinder, forms a sliding surface for the piston rings while retaining the lubricant within. The cylinder liner receives combustion heat through the piston and piston rings and transmits the heat to the coolant. The cylinder liner prevents the compressed gas and combustion gas from escaping outside.

A cylinder liner becomes distorted under assembly when the cylinder block and liner are assembled together with the cylinder head, head gasket, and cylinder head capscrews. There is additional distortion that comes from thermal expansion and cylinder pressure. In particular, a cylinder liner can have distortion that is primarily radial growth and ovalization of the liner. Complex higher order distortions of the cylinder liner bore can also occur and can result from one or more of the cylinder head bolts along with other key structural influences such as from the cylinder block, head gasket, or the cylinder head. These complex higher order distortions pose a higher risk to piston ring conformability and consequently high oil consumption. Moreover, the cylinder liner can deform due to loads from cylinder pressure or thermal expansion.

Moreover, the cylinder liner under applied loads from the cylinder head tends to balloon outwards (0 order growth) between a top end and a mid-stop on the cylinder liner. The different higher order deformations from the mid-stop and top band tend to magnify along with liner radial growth. The top end and mid-stop are some of the key contributors for the cylinder liner distortion but not the only ones. Some techniques to minimize this radial growth include shortening the mid-stop height and increasing the liner thickness. However there are limitations on the amount that the mid-stop height can be shortened and the liner thickness can be increased without negatively impacting liner temperatures.

Other existing solutions to these problems have included adding an external rib structure to the cylinder block. However, external rib structures are not always adequate or sufficient to control distortion and can increase weight and cost.

Therefore, further contributions in this area of technology are needed to reduce and control the distortion of the cylinder liner bore. Therefore, there remains a significant need for the apparatuses, methods and systems disclosed herein.

SUMMARY

A cylinder liner for a cylinder bore of a cylinder of an internal combustion engine. The cylinder liner includes a cylindrical casing having an outer surface and an inner surface, wherein each surface has a respective surface area. The liner includes a liner seat positioned on the outer surface wherein the liner seat engages with the cylinder bore to position the cylindrical casing in the cylinder bore. The liner includes a relief feature positioned on the outer surface, adjacent and/or above the liner seat wherein the relief feature resists distortion of the cylindrical casing from the cylinder bore. The liner can optionally include a stiffening feature positioned above the relief feature on the outer surface. The relief feature forms a depressed surface on the outer surface and the stiffening feature forms a raised surface on the outer surface of the cylindrical casing. The relief feature may extend to the stiffening feature or there may be a small gap between the relief and stiffening features.

The cylinder bore distortion can be split or divided into different harmonics or orders, and the piston ring conformability limits for each order is dependent on the piston ring being used. The cylinder bore distortion is also dependent on the number of cylinder head bolts per cylinder in the engine or cylinder head block. The number of head bolts is one of the factor but not the only one. For example, if there are 6 cylinder head bolts per cylinder, then the $6^{th}$ order distortion is improved compared to conventional cylinder liners that do not include the relief and stiffening features. As another example, if there are 4 cylinder head bolts, then the $4^{th}$ order distortion is improved compared to conventional cylinder liners that do not include the relief and stiffening features. The improvement in distortion is not only on the $6^{th}$ and $4^{th}$ order for 6 and 4 head bolt engines but also an overall reduction in distortion magnitude across all orders.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWING

In order that the advantages of the subject matter may be more readily understood, a more particular description of the subject matter briefly described above will be rendered by reference to certain embodiments that are illustrated in the appended drawings.

Understanding that these drawings depict only typical embodiments of the subject matter and are not therefore to be considered to be limiting of its scope, the subject matter will be described and explained with additional specificity and detail through the use of the drawings, in which.

Corresponding reference numerals are used to indicate corresponding parts throughout the several views.

DETAILED DESCRIPTION OF REPRESENTATIVE EMBODIMENTS

Figure 1:
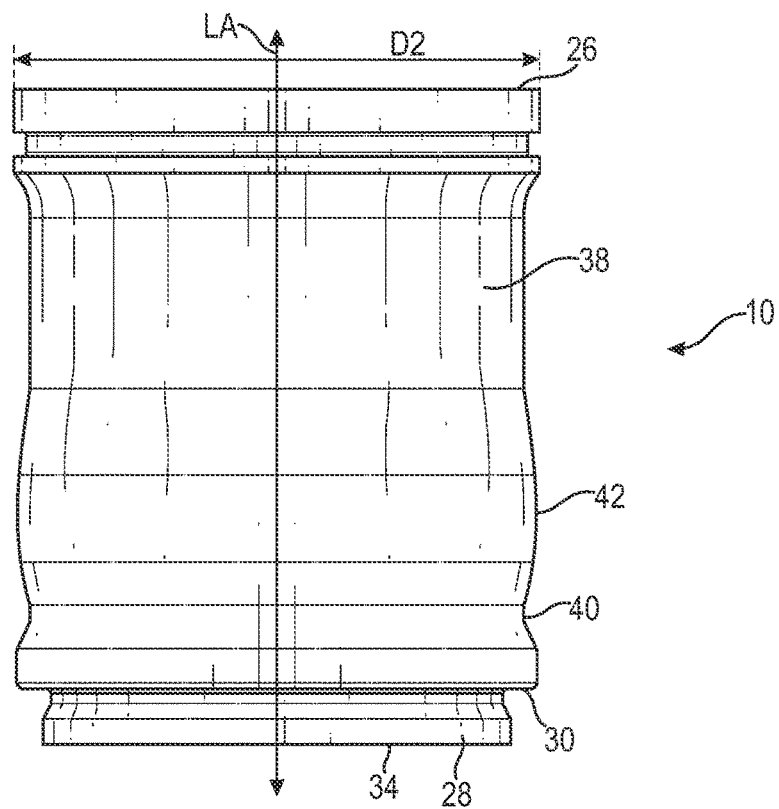
FIG. 1 is a partial side view of a first embodiment of a cylinder liner of the present disclosure.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Generally, a cylinder liner is a cylindrical part to be fitted into an engine block to form a cylinder. The cylinder liner, serving as the inner wall of a cylinder, forms a sliding surface for the piston rings while retaining the lubricant within. Some important functions of cylinder liners include an excellent sliding surface as well as high anti-galling properties, less wear on the cylinder liner itself, less wear on the partner piston ring, and less consumption of lubricant.

A cylinder liner or sleeve is installed by boring the cylinder to a size that is larger than normal inserted with an interference fit. Alternatively, the liners can be pressed into place, or the liners can be held in by a shrink fit. Cylinder wall thickness is important to efficient thermal conductivity in an internal combustion engine. When choosing sleeves, engines have specifications to how thick the cylinder walls should be to prevent overworking the coolant system. Each engine's needs are different, dependent on designed work load duty cycle and energy produced.

The cylinder liner receives combustion heat through the piston and piston rings and transmits the heat to the coolant. The cylinder liner prevents the compressed gas and combustion gas from escaping outside.

There are two types of cylinder liners including a dry liner which is a liner assembled into the engine base block or cylinder bore without direct contact between coolant and liner and a wet liner which is a liner assembled into the engine base block or cylinder bore with direct contact between coolant and liner.

Moreover, there are four liner stop types that designate how the liner is assembled with the cylinder bore and these types are known as a top stop, mid stop, bottom stop, and deck stop. Generally, the cylinder head sealing surface is called the top end of the engine. The top-stop liner concept includes a flange or a liner seat on the top of the liner with which it is located into the cylinder block. The mid-stop has a similar flange or liner seat at or near the middle of the liner, and the bottom stop has its locating flange or liner seat near the lower end of the liner. In any of the top, mid, and bottom stop liner configurations, the cylinder bore of the engine block includes a liner stop mechanism that is configured to receive the liner such the corresponding flange or liner seat 30 engages with the liner stop mechanism.

It is contemplated that an engine for the present disclosure can be an internal combustion engine of any type, and can include a stoichiometric engine, a gasoline engine, alcohol engine (e.g. ethanol or methanol), or a natural gas engine. The engine (not illustrated) includes an engine block that at least partially defines one or more cylinder bores. The number of cylinders may be any number, and the arrangement of cylinders may be any arrangement.

Each of the cylinder bores is surrounded by a cylinder bore wall. The cylinder bore wall includes a liner stop mechanism (not illustrated) configured to locate a cylinder liner or sleeve in the cylinder bores. The liner stop mechanism is a lip, ledge, flange, rim, projecting edge, ridge or other configuration in the cylinder bore wall. In other embodiments, the liner stop mechanism can be configured differently to engage and retain the cylinder liner in the cylinder bore. The cylinder bore wall includes an upper end opposite a lower end such that the liner stop mechanism is positioned between the upper and lower ends. A cylindrical axis spans between the upper and lower ends.

Each of the cylinder bores (not illustrated) is configured to receive a cylinder liner (illustrated in FIGS. 1, 2, and 3) to define a combustion chamber. A piston (not shown) may be slidably disposed within each of the cylinder liners in the cylinder bores to reciprocate between a top-dead-center position and a bottom-dead-center position, and a cylinder head (not shown) may be associated with each of the cylinder bores. Each of the cylinder bores, its respective piston, and the cylinder head form a combustion chamber. It is contemplated that the engine block may include a 4, 6, 8, or a greater or lesser number of cylinders and combustion chambers and that the cylinders and combustion chambers may be disposed in an "in-line" configuration, a "V" configuration, or in any other suitable configuration.

Cylinder liners may be inserted into cylinder bores under a variety of conditions. One such condition is a press fit, also known as an interference fit or friction fit, for example, creates an axial hold where adjoining parts share the same space by creating a slight elastic deformation and a compression force between the adjoining parts. Compression from the press fit increases the friction between the adjoining parts to a point where independent movement of the adjoining parts is not possible under normal operating conditions. Press fits between the cylinder liner and engine block may be created using physical presses, principles of thermal expansion or other suitable methods.

Figure 2:
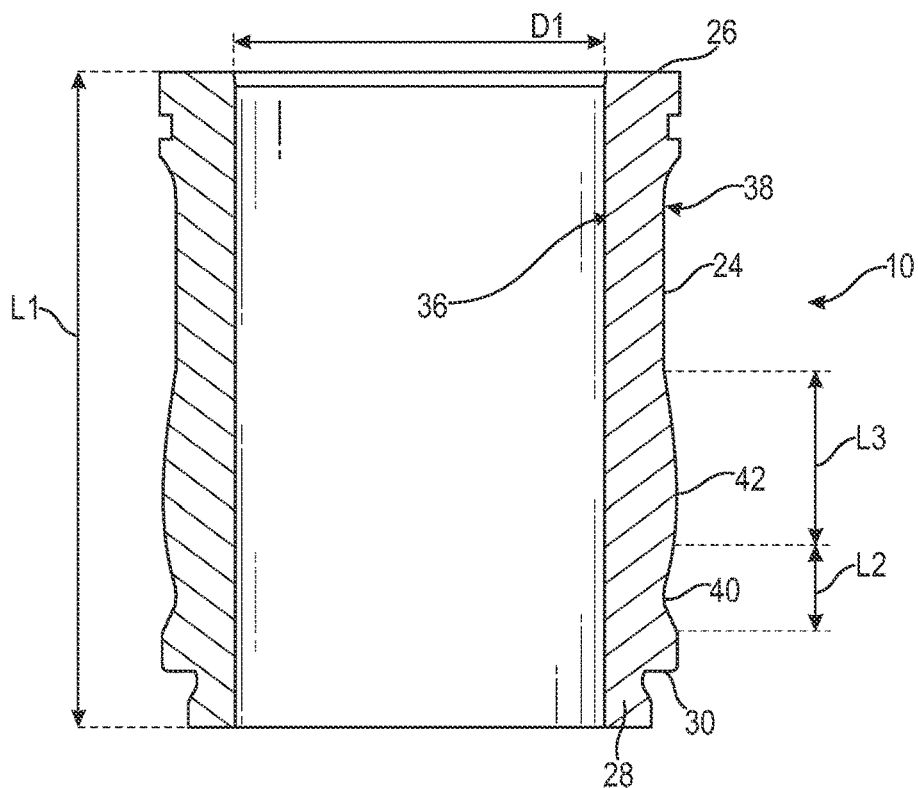
FIG. 2 is a cross-sectional view of the cylinder liner shown in FIG. 1.

Turning now to FIGS. 1 and 2, a cylinder liner 10 is illustrated. The cylinder liner 10 includes a cylindrical casing 24 of a predetermined length L1 having a longitudinal axis LA that spans along the length L1. Casing 24 includes a first end 26 and a second end 28. The second end 28 includes a liner seat 30 that is integrally formed with casing 24. Liner seat 30 is used to properly position liner 10 within the cylinder bore. The cylinder bore includes a liner stop mechanism such as a counterbore that mates with the liner seat 30 of casing 24 to properly position the liner 10 within the cylinder bore. Additionally, second end 28 includes a bottom 34. Bottom 34, along with second end 28 of casing 24, is received in the cylinder bore. When the liner seat 30 is mated with the liner stop mechanism, bottom 34 is properly positioned within the cylinder bore.

Additionally, liner 10 includes an inner surface 36 and an outer surface 38 each having respective surface areas. Inner surface 36 of liner 10 is generally planar and includes an inner diameter $D_1$. Inner surface 36 is in contact with the piston and being generally planar is desirable for guiding the piston through its range of movement. Outer surface 38 includes a second diameter $D_2$. In contrast, outer surface 38 of liner 10 is not planar but includes a relief feature 40 positioned near the liner seat 30 or mid-stop. By positioning the relief feature 40 above the mid-stop 30 as illustrated in FIGS. 1 and 2, the direction of the radial growth can be reversed and/or magnitude of radial growth can be reduced which can control or reduce the amplification of higher order deformations such that the distortion of the cylinder liner stays below the piston ring limits. In the illustrated embodiment, the outer surface 38 of the liner 10 also includes a stiffening feature 42 positioned adjacent the relief feature 40. The stiffening feature 42 is optional and not required in other embodiments. The combination of the relief feature 40 and the stiffening feature 42 (if present) on the outer surface 38 forms an outer profile of the cylinder liner 10 that allows the cylinder liner 10 to control and reduce cylinder distortion and liner bore distortion at and around the relief and stiffening features 40 and 42 wherever the relief and stiffening features 40 and 42 are positioned along the length $L_1$. The length, cross-sectional shape, and longitudinal position of the relief and stiffening features 40 and 42 enables the cylinder liner 10 to counteract and resist the cylinder bore distortion from the engine block. The relief and stiffening features 40 and 42 can be located anywhere along the length $L_1$ that is beneficial to reduce cylinder liner and cylinder bore distortion. As such, the location of the relief and stiffening features 40 and 42 is not limited or required to be close to or adjacent to the liner seat 30.

Without the relief feature 40 or the stiffening feature 42 on the outer surface 38 of the cylinder liner 10, the cylinder bore distortion would be primarily radial growth and ovalization of the cylinder liner and other complex distortions from the cylinder head bolts of the engine. These complex higher order distortions pose a higher risk to piston ring conformability and consequently higher oil consumption. The relief feature 40 controls or reduces this higher order distortion. If the stiffening feature 42 is formed in the outer profile of the cylinder liner 10, then the stiffening feature 42 also assists the relief feature 40 to resist this higher order distortion.

The relief feature 40 can have any shape that is depressed relative to the second diameter $D_2$ and/or relative to the stiffening feature 42. For example, in the illustrated embodiment of FIG. 2, the relief feature 40 has a concave shape. The relief feature 40 can have other shapes such as a depressed band, slot, notch, relief radius, or other shape to disrupt the outer surface profile inwardly towards the longitudinal axis LA. The relief feature 40 has a length L2, size, and cross-sectional shape that is generally uniform around the circumference of the cylinder liner 10. However, in other embodiments, one or more of the length L2, size, and cross-sectional shape of the relief feature 40 can vary around the circumference of the cylinder liner 10.

Adjacent to the relief feature 40 is the stiffening feature 42 that provides additional material relative to the second diameter $D_2$ to further resist distortion of the cylinder liner 10. The stiffening feature 42 can have a convex shape that provides a bulging or raised surface relative to the second diameter $D_2$ and relative to the relief feature 40. The stiffening feature 42 can have other shapes such as a band, ring, corrugated, rectangular, trapezoidal, or other shape to disrupt the outer surface profile outwardly away from the longitudinal axis LA. The stiffening feature 42 has a length L3, size, and cross-sectional shape that is generally uniform around the circumference of the cylinder liner 10. However, in other embodiments, one or more of the length L3, size, and cross-sectional shape of the stiffening feature 42 can vary around the circumference of the cylinder liner 10.

The stiffening feature 42 extends to contact the relief feature 40 however in other embodiments the stiffening feature 42 can be spaced a distance from the relief feature 40. The position, cross-sectional shape, length, and size of the relief and stiffening features 40 and 42 can be modified to meet a specific architecture's requirements of the cylinder liner 10 and the cylinder bore. Beneficially, the relief and stiffening features 40 and 42 are configured to reduce the overall cylinder liner bore distortion which will reduce oil consumption of the internal combustion engine and improve blow by. The relief and stiffening features 40 and 42 provide a disruption of the radial growth of the cylinder liner 10 that in turn helps to control higher order distortion from the engine block structure and in particular from the cylinder head bolts.

Figure 3:
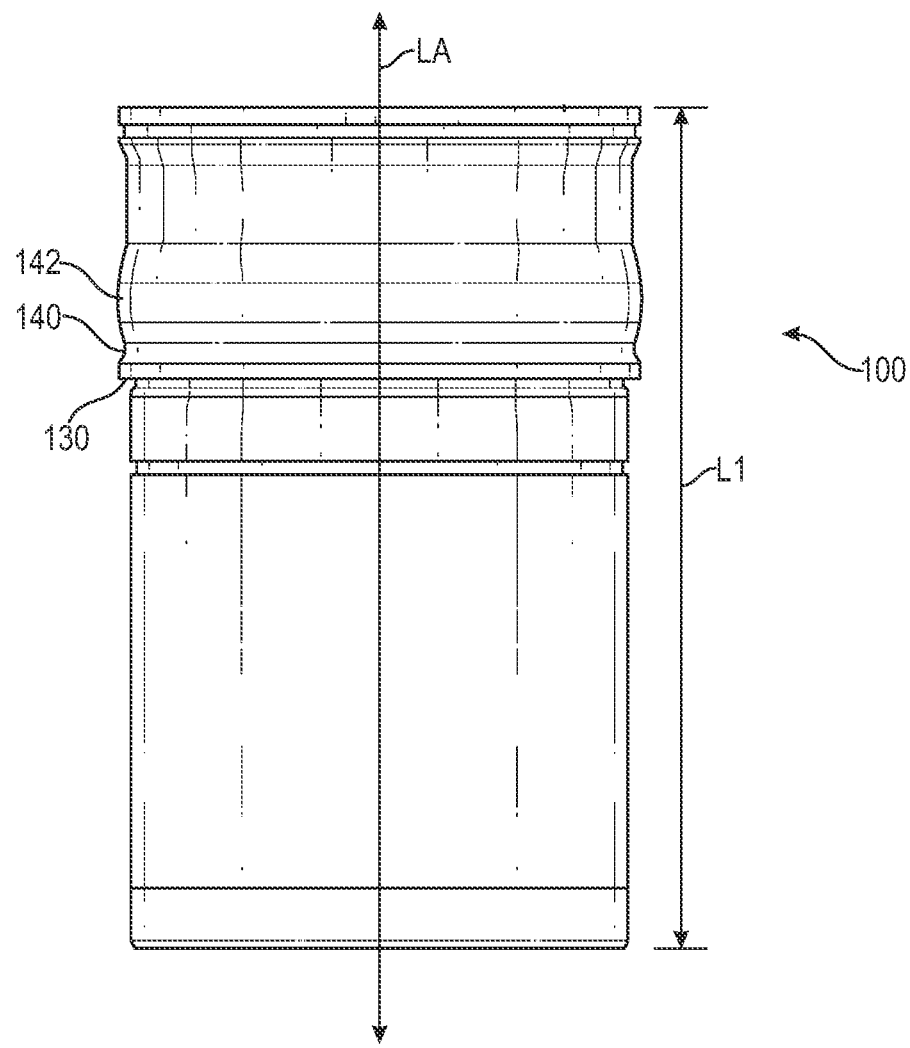
FIG. 3 is a side view of a second embodiment of a cylinder liner of the present disclosure.

Turning now to FIG. 3, is a second embodiment of a cylinder liner 100 that is substantially similar to cylinder liner 10 except as described next. Cylinder liner 100 has a relief feature 140 and a stiffening feature 142 that are substantially similar to relief feature 40 and stiffening feature 142, respectively. The cylinder liner 100 includes a liner seat 130 that is similar to liner seat 30 however the liner seat 130 is positioned mid-way along a predetermined length L1 such that the cylinder liner 100 is considered a high mid-stop style liner. The relief and stiffening features 140 and 142 are positioned close to the liner seat 130. As can be appreciated, the relief and stiffening features 140 and 142 (or 40 and 42) can be positioned along the length L1 for other styles of cylinder liners including top, mid or bottom stop cylinder liners.

In some forms, the cylinder bore distortion can be split or divided into different harmonics or orders, and the piston ring conformability limits for each order is dependent on the piston ring being used. The cylinder bore distortion is also dependent on the number of cylinder head bolts per cylinder in the engine or cylinder head block. The number of head bolts is one of the factors but not the only one. For example, if there are 6 cylinder head bolts per cylinder, then testing has shown that the $6^{th}$ order distortion is improved compared to conventional cylinder liners that do not include the relief and stiffening features 40 and 42 (or 140 and 142). As another example, if there are 4 cylinder head bolts, then testing has shown that the $4^{th}$ order distortion is improved compared to conventional cylinder liners that do not include the relief and stiffening features 40 and 42 (or 140 and 142). The improvement in distortion is not only on the $6^{th}$ and $4^{th}$ order for 6 and 4 head bolt engines but also an overall reduction in distortion magnitude across all orders.

As is evident from the figures and text presented above, a variety of aspects of the present disclosure are contemplated.

Various aspects of the apparatus, systems, and methods disclosed herein are contemplated. For example, one aspect relates to a cylinder liner for a cylinder bore of a cylinder, the cylinder liner comprises a cylindrical casing having an outer profile that includes an outer diameter as measured relative to a longitudinal axis of the cylindrical casing, the cylindrical casing having an inner surface that includes an inner diameter as measured relative to the longitudinal axis. The cylinder liner includes a liner seat on the outer profile, the liner seat configured to engage the cylinder bore to position the cylindrical casing in the cylinder bore. The cylinder liner includes a relief feature on the outer profile, the relief feature having a depressed profile relative to the outer profile of the cylindrical casing wherein the relief feature is configured to resist distortion of the cylindrical casing from the cylinder bore.

In one embodiment, the cylinder liner further comprises a stiffening feature on the outer profile of the cylindrical casing positioned near the relief feature such that the relief feature is located between the liner seat and the stiffening feature.

In another embodiment of the cylinder liner, the depressed profile of the relief feature is depressed relative to a profile of the stiffening feature.

In yet another embodiment of the cylinder liner, the stiffening feature has a raised profile relative to the outer profile of the cylindrical casing.

In a further embodiment of the cylinder liner, wherein the stiffening feature has a convex profile relative to the outer profile of the cylindrical casing.

In another embodiment of the cylinder liner, the stiffening feature is positioned a distance from the relief feature as measured relative to the longitudinal axis of the cylindrical casing.

In yet another embodiment of the cylinder liner, the depressed profile of the relief feature has a concave shape.

For example, one aspect relates to a cylinder liner for a cylinder bore of a cylinder, the cylinder liner comprises a cylindrical casing having an outer surface and an inner surface, the cylinder casing configured to assemble with the cylinder bore, a stiffening feature on the outer surface of the cylindrical casing, and a relief feature positioned adjacent the stiffening feature on the outer surface of the cylindrical casing, the relief feature and the stiffening feature configured to resist radial distortion of the cylindrical casing from the cylinder bore.

In one embodiment of the cylinder liner, the relief feature has a depressed profile relative to an outer profile of the cylindrical casing.

In another embodiment of the cylinder liner, further comprises a liner seat on the outer surface, the liner seat configured to engage the cylinder bore to position the cylindrical casing in the cylinder bore. In one refinement of this embodiment, the relief feature is located between the liner seat and the stiffening feature.

In yet another embodiment of the cylinder liner, the relief feature has a depressed profile relative to a profile of the stiffening feature.

In another embodiment of the cylinder liner, the stiffening feature has a raised profile relative to an outer profile of the cylindrical casing.

In yet another embodiment of the cylinder liner, the stiffening feature has a convex profile.

In yet another aspect relates to a cylinder liner for a cylinder bore of a cylinder, the cylinder liner comprising a cylindrical casing having an outer surface and an inner surface, the cylinder casing configured to assemble with the cylinder bore; and a relief feature positioned on the outer surface of the cylindrical casing, the relief feature configured to reduce cylinder bore distortion.

In one embodiment of the cylinder liner, further comprising a liner seat on the outer surface of the cylindrical casing, the liner seat configured to engage the cylinder bore to position the cylindrical casing in the cylinder bore.

In one embodiment of the cylinder liner, further comprising a stiffening feature on the outer surface of the cylindrical casing, wherein the relief feature is located between the liner seat and the stiffening feature.

In another embodiment of the cylinder liner, wherein the stiffening feature is positioned a distance from the relief feature as measured relative to the longitudinal axis of the cylindrical casing.

In yet another embodiment of the cylinder liner, wherein the stiffening feature has a raised profile relative to an outer profile of the cylindrical casing.

In another embodiment of the cylinder liner, wherein the relief feature has depressed profile relative to an outer profile of the cylindrical casing. In one refinement of this embodiment of the cylinder liner, the depressed profile is a concave shape.

In yet another example, one aspect of a cylinder liner for a cylinder bore of a cylinder, the cylinder liner comprises a cylindrical casing having an outer surface and an inner surface, a liner seat positioned on the outer surface, the liner seat configured to engage with the cylinder bore to position the cylindrical casing in the cylinder bore; and a relief feature positioned adjacent the liner seat on the outer surface, the relief feature configured to resist distortion of the cylindrical casing from the cylinder bore.

Another example of another aspect of a cylinder liner for a cylinder bore of a cylinder, the cylinder liner comprises a cylindrical casing having an outer surface and an inner surface, the cylinder casing configured to assemble with the cylinder bore; and a relief feature positioned adjacent a stiffening feature on the outer surface, the relief feature and the stiffening feature configured to resist radial distortion of the cylindrical casing from the cylinder bore.

A further example of an aspect of a cylinder liner for a cylinder bore of a cylinder, the cylinder liner comprises a cylindrical casing having an outer surface and an inner surface, the cylinder casing configured to assemble with the cylinder bore; and a relief feature positioned on the outer surface, the relief feature configured to reduce overall distortion magnitude across all orders of the cylindrical casing from the cylinder bore, wherein the orders correspond to a number of headbolts required for the cylinder.

In the above description, certain relative terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A cylinder liner for a cylinder bore of a cylinder, the cylinder liner comprising:
    a cylindrical casing having an outer profile that includes an outer diameter as measured relative to a longitudinal axis of the cylindrical casing, the cylindrical casing having an inner surface that includes an inner diameter as measured relative to the longitudinal axis, wherein the inner and outer surfaces span between a top end and a bottom end of the cylindrical casing;
    a liner seat on the outer profile adjacent to the bottom end of the cylindrical casing, the liner seat configured to engage a liner stop mechanism on the cylinder bore to position and support the cylindrical casing in the cylinder bore;
    a relief feature on the outer profile that is positioned adjacent to and above the liner seat as measured relative to the longitudinal axis, the relief feature having a depressed profile relative to the outer profile of the cylindrical casing wherein the relief feature is configured to resist distortion of the cylindrical casing from the cylinder bore; and
    a stiffening feature on the outer profile that is positioned adjacent to and above the relief feature as measured relative to the longitudinal axis, wherein the liner seat, the relief feature, and the stiffening feature are located closer to the bottom end than the top end of the cylindrical casing.

2. The cylinder liner of claim 1, wherein the depressed profile of the relief feature is depressed relative to a profile of the stiffening feature.

3. The cylinder liner of claim 1, wherein the stiffening feature has a raised profile relative to the outer profile of the cylindrical casing.

4. The cylinder liner of claim 1, wherein the stiffening feature has a convex profile relative to the outer profile of the cylindrical casing.

5. The cylinder liner of claim 1, wherein the depressed profile of the relief feature has a concave shape.

6. A cylinder liner for a cylinder bore of a cylinder, the cylinder liner comprising:
    a cylindrical casing having an outer profile that includes an outer surface, wherein the outer profile includes an outer diameter as measured relative to a longitudinal axis of the cylindrical casing, the cylindrical casing includes an inner surface, the cylindrical casing configured to assemble with the cylinder bore, wherein the inner and outer surfaces span between a top end and a bottom end of the cylindrical casing;
    a stiffening feature on the outer surface of the cylindrical casing, wherein the stiffening feature includes a raised profile relative to the outer diameter of the outer profile of the cylindrical casing;
    a relief feature positioned adjacent the stiffening feature on the outer surface of the cylindrical casing, the relief feature and the stiffening feature configured to resist radial distortion of the cylindrical casing from the cylinder bore; and
    a liner seat positioned adjacent the relief feature on the outer surface adjacent to the bottom end of the cylindrical casing, the liner seat configured to engage a liner stop mechanism on the cylinder bore to position and support the cylindrical casing in the cylinder bore, wherein the stiffening feature, the relief feature, and the liner seat are located closer to the bottom end than the top end of the cylindrical casing.

7. The cylinder liner of claim 6, wherein the relief feature has a depressed profile relative to the outer profile of the cylindrical casing.

8. The cylinder liner of claim 6, wherein the relief feature is located between the liner seat and the stiffening feature.

9. The cylinder liner of claim 6, wherein the relief feature has a depressed profile relative to a profile of the stiffening feature.

10. The cylinder liner of claim 6, wherein the stiffening feature has a convex profile.

11. A cylinder liner for a cylinder bore of a cylinder, the cylinder liner comprising:
    a cylindrical casing having an outer surface and an inner surface, wherein the inner and outer surfaces span between a top end and a bottom end, the cylindrical casing configured to assemble with the cylinder bore;
    a liner seat adjacent to the bottom end of the cylindrical casing, the liner seat configured to engage a liner stop mechanism on the cylinder bore to position and support the cylindrical casing in the cylinder bore;
    a relief feature positioned on the outer surface of the cylindrical casing adjacent to the liner seat, the relief feature configured to reduce cylinder bore distortion; and
    a stiffening feature positioned on the outer surface of the cylindrical casing adjacent to the relief feature, wherein the stiffening feature, the relief feature, and the liner seat are located closer to the bottom end than the top end of the cylindrical casing.

12. The cylinder liner of claim 11, wherein the stiffening feature has a raised profile relative to an outer profile of the cylindrical casing.

13. The cylinder liner of claim 11, wherein the relief feature has depressed profile relative to an outer profile of the cylindrical casing.

14. The cylinder liner of claim 13, wherein the depressed profile is a concave shape.

\* \* \* \* \*